(12) United States Patent
Binder et al.

(10) Patent No.: US 6,491,744 B2
(45) Date of Patent: Dec. 10, 2002

(54) DEVICE FOR DEAERATING OF FIBER STOCK SUSPENSIONS

(75) Inventors: Erwin Binder, Heidenheim (DE); Karl-Heinz Beuermann, Heidenheim (DE)

(73) Assignee: Voith Paper Patent GmbH, Heidenheim (DE)

( * ) Notice: Subject to any disclaimer, the term of this patent is extended or adjusted under 35 U.S.C. 154(b) by 48 days.

(21) Appl. No.: 09/826,614

(22) Filed: Apr. 5, 2001

(65) Prior Publication Data

US 2002/0060027 A1 May 23, 2002

(30) Foreign Application Priority Data

Apr. 5, 2000 (DE) .......................... 100 17 037

(51) Int. Cl.[7] .............................................. B01D 19/00
(52) U.S. Cl. .............................. 96/193; 96/197; 96/200
(58) Field of Search ................... 162/380, 339; 95/247, 266; 96/193, 194, 197, 198, 200

(56) References Cited

U.S. PATENT DOCUMENTS

| 3,206,917 A | * | 9/1965 | Kaiser et al. |
| 3,421,622 A | * | 1/1969 | Wurtmann |
| 3,432,036 A | * | 3/1969 | Kaiser |
| 3,538,680 A | | 11/1970 | Kaiser |
| RE29,472 E | * | 11/1977 | Kaiser |
| 4,219,340 A | * | 8/1980 | Kaiser |
| 4,419,109 A | * | 12/1983 | Matula |
| 4,443,232 A | * | 4/1984 | Kaiser |
| 5,084,161 A | * | 1/1992 | Vikio |
| 5,236,475 A | * | 8/1993 | Evens |
| 5,268,077 A | * | 12/1993 | Bubik et al. |
| 5,308,384 A | * | 5/1994 | Kapanen et al. |
| 5,868,905 A | | 2/1999 | Graf et al. |
| 6,096,120 A | * | 8/2000 | Erlund et al. |
| 6,416,632 B1 | * | 7/2002 | Kirjasniemi et al. |

FOREIGN PATENT DOCUMENTS

| DE | 32 19 740 A1 | 12/1982 |
| DE | 42 34 522 A1 | 4/1993 |
| DE | 199 47 905.4 | 10/1999 |
| WO | WO 97/15717 | 5/1997 |

\* cited by examiner

*Primary Examiner*—Duane S. Smith
(74) *Attorney, Agent, or Firm*—Taylor & Aust, P.C.

(57) ABSTRACT

The invention creates a device for deaerating fiber stock suspension including a horizontal cylinder tank, an inlet, an outlet opening, and a vacuum connection. An overflow tube may be positioned independently of the location of the inlet for the fiber stock suspension and the outlet for the deaerated fiber stock suspension.

45 Claims, 2 Drawing Sheets

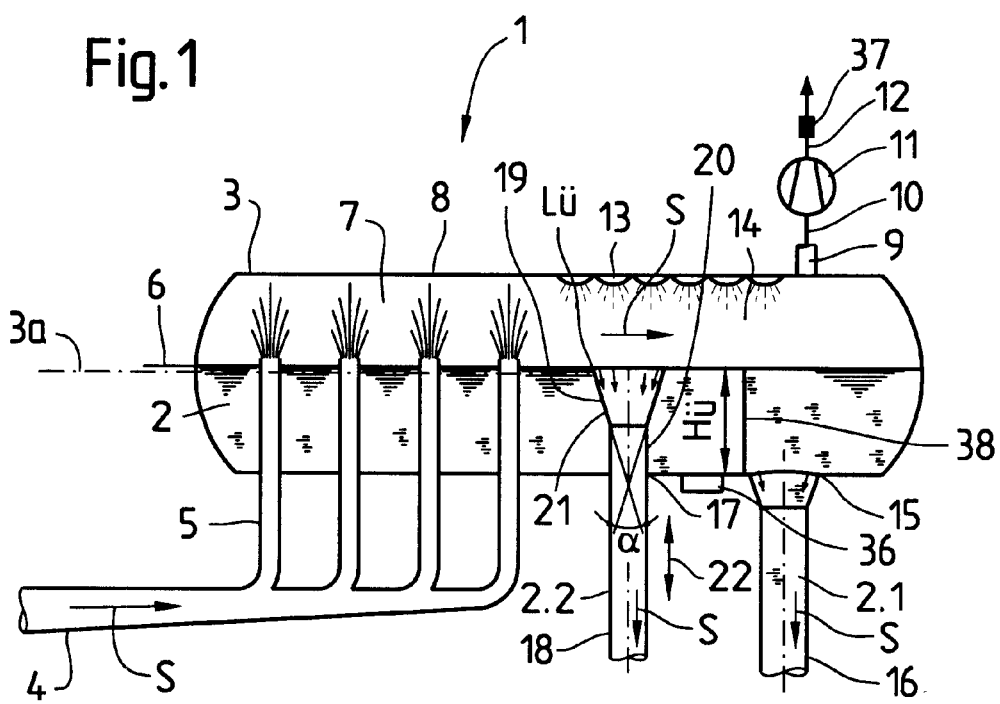
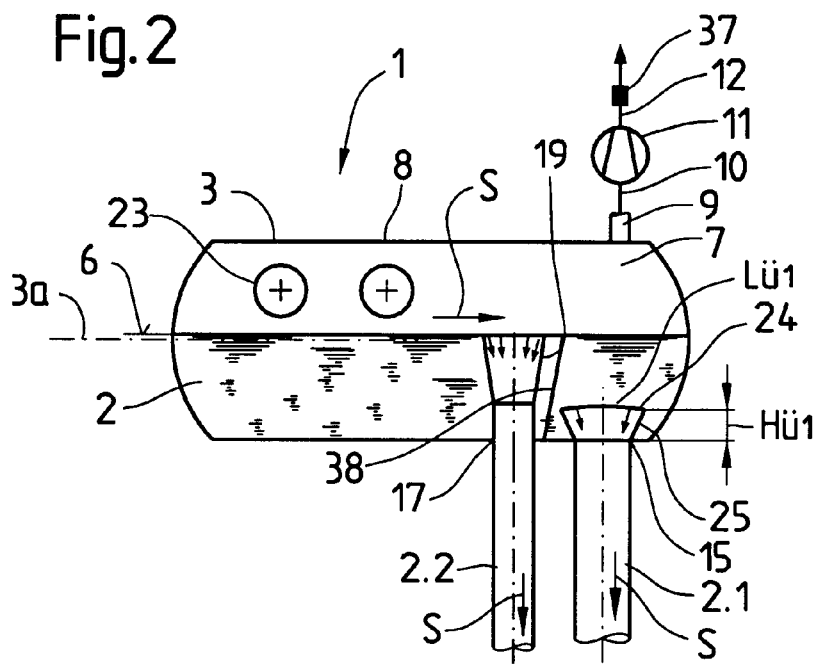

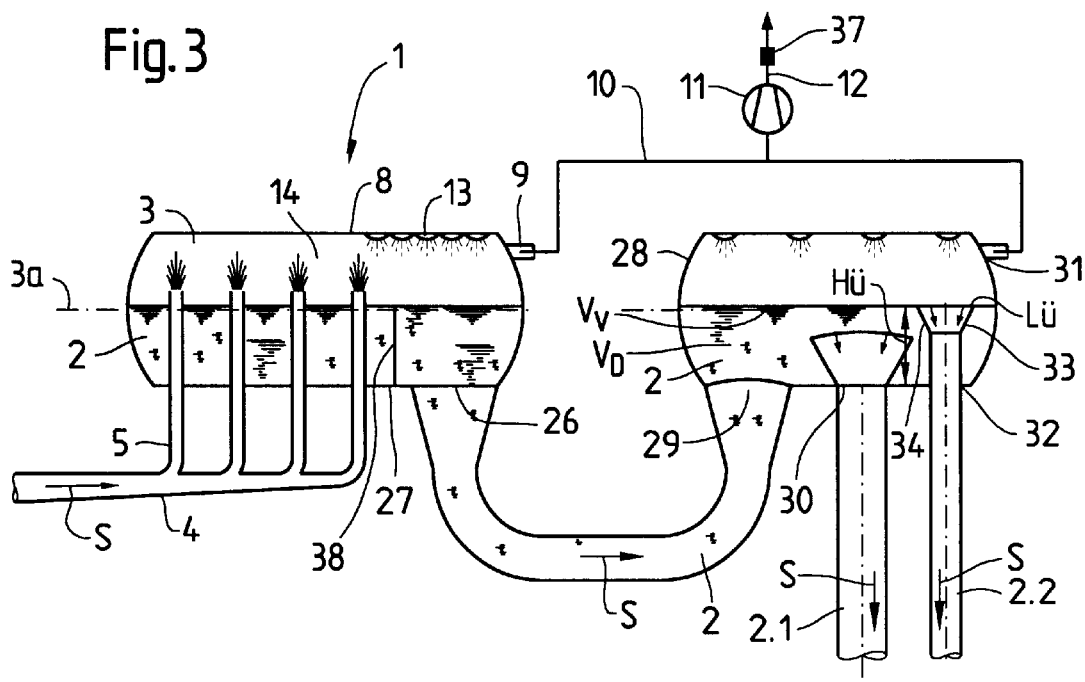
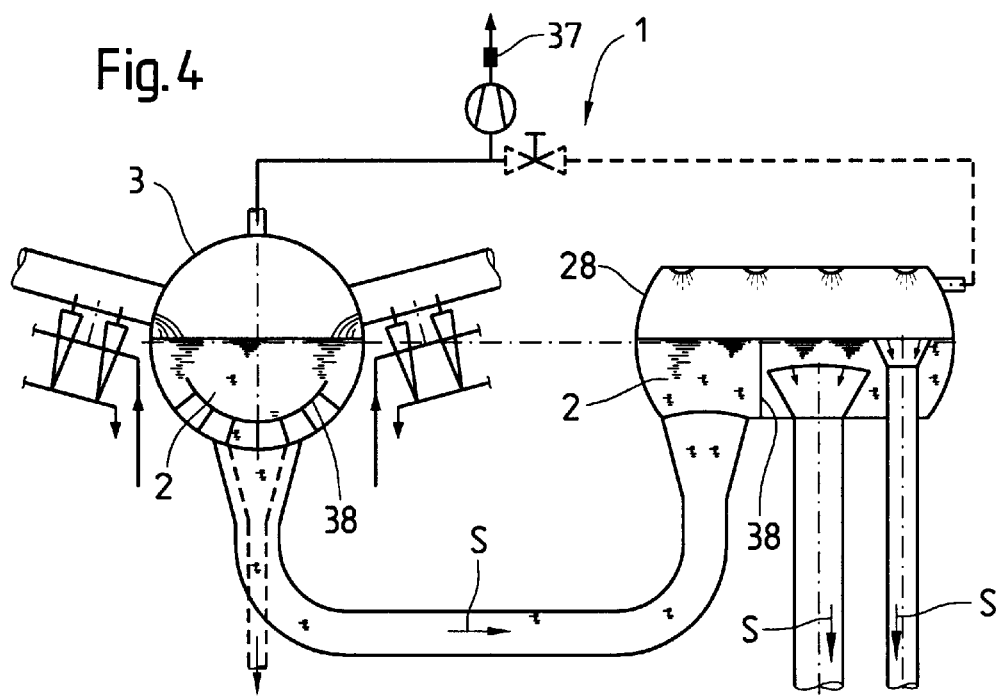

DEVICE FOR DEAERATING OF FIBER STOCK SUSPENSIONS

BACKGROUND OF THE INVENTION

1. Field of the Invention

The present invention relates to a device for deaerating a fiber stock suspension.

2. Description of the Related Art

Devices for the deaeration of fiber stock suspensions are well known to the experts in the industry. As the name indicates, these devices deaerate fiber stock suspensions. During deaeration minor contaminates which would otherwise interfere with paper or cardboard production are removed. The devices are large tanks into which the fiber stock suspension, that is to be supplied to the paper or cardboard machine, is fed in the form of a thin mixture. The functional principle of the device is that the fiber stock suspension is boiled in a vacuum, the gas is removed to a so-called gas chamber, and the other minor impurities present on the liquid surface in the tank are discharged. The fiber stock suspension which is to be supplied to the paper or cardboard machine is removed through an opening in the tank floor, located there for the purpose of removing fiber stock suspension from the tank that is as gas free as possible. In order to maximize the deaerating capabilities of the device, a vacuum is generated in the tank by a pump, whereby the gas is forced through a line from the tank. The deaerating capability is improved when the supplied gas-containing fiber stock suspension is fed into the tank through steel pipes located above the liquid level in the tank, whereby the gas which is present in the added fiber stock suspension, possibly in the form of bubbles is discharged prior to coming into contact with the already present fiber stock suspension. In addition to stabilizing the liquid level, the single overflow is used to remove minor contaminations from the liquid surface in the tank, so they do not reach the paper or cardboard machine. The minor contaminates flow over the single overflow to the discharge and then on to further treatment.

German Disclosure Document DE 42 34 522 A1 describes a deaeration chamber in accordance with the aforementioned generic term of the present invention, as used in the paper and pulp industry. The separation wall which forms the overflow for the separated, excess fiber stock suspension is essentially level with the rear edge of the outlet for the gas-free suspension and the overflow for the separated, excess suspension itself slopes toward the overflow in the tank, in opposite direction to the flow direction.

Further disclosures regarding the position and shape of the separation wall forming the overflow for the separated, excess fiber stock suspension may be found in the German prior art documents DE 32 19 740 A1, in the PCT application WO 97/15717 and in U.S. Pat. No. 5,868,905 (PK10542 US).

All aforementioned documents share the disadvantages with regard to the overflow for the separated, excess fiber stock suspension in that the separation wall is located transversely and symmetrically to the tank axis (longitudinal axis), that it's location is a given due to it's shape, meaning that it is located on one of the two end areas of the tank and it's overflow length is fixed.

SUMMARY OF THE INVENTION

The present invention provides a device for deaerating of fiber stock suspension where the overflow for the separated, excess fiber stock suspension can be located independently from both the inlet for the fiber stock suspension and the outlet for the deaerated fiber stock suspension. An overflow in the shape of an overflow pipe having an overflow height and an overflow length located prior to the outlet opening for the separated, excess fiber stock suspension, viewed in the flow direction.

In one embodiment of the invention a dwell chamber in the form of a hydraulic stabilizer is located after the outlet opening for the gas-free fiber stock suspension. The dwell chamber consisting of preferably a long horizontally cylindrical tank, with at least one inlet opening to accept the fiber stock suspension coming from a prior tank. The tank having outlet openings for the separate discharge of the. gas-free fiber stock suspension, the separated gas, the excess fiber stock suspension and the separated, excess fiber stock suspension. The opening for the discharge of the separated excess fiber stock suspension being an overflow tube having an overflow height and an overflow length.

By designing the overflow for the separated, excess fiber stock suspension as an overflow tube having an overflow height and an overflow length, a design advantage as well as a fluidic advantage is achieved in that the overflow for the separated, excess fiber stock suspension may be positioned at any desired location in the tank; rather than being positioned transversely and symmetrically to the tank axis in one of the two end areas of the tank. Further, the design of the overflow length may be freely selected within a certain range.

In one embodiment of the invention the overflow pipe has a funnel shaped opening with an aperture angle of between 30° and 80°, preferably between 40° and 50°. This type of initial opening has an advantage in that the opening orifice area of the overflow tube is independent from the continuing diameter of the overflow tube. In addition, the flow geometry can be positively influenced by the selection of the aperture angle.

One embodiment of the invention provides that the overflow tube be a telescopic structure, thereby offering a changeable overflow height. Changeability of the overflow height provides the option to control the liquid level in the tank, or to regulate it, if a drive unit including a control system are present, whereby the liquid level will influence the dwell duration and the dwell volume of the fiber stock suspension in the tank. The telescopic construction of the overflow tube may be a sliding device.

A further embodiment of the invention provides, that the overflow tube including the discharge pipe be movable, thereby providing for an adjustable overflow height. The discharge pipe of the overflow tube also may have a transition piece whose length and shape are adjustable so that, even if the overflow tube is moved, no local shifting occurs in the subsequent system. The transitional piece would preferably be in the form of folded tubing.

In yet a further embodiment of the invention the overflow tube is a telescopic and divergent structure, providing for an adjustable overflow length. An increased overflow length provides the advantage of additional abatement due to reduced flow in the separated, excess fiber stock suspension.

In a preferred embodiment of the invention, the overflow tube can be coupled with at least one tube segment, thereby providing adjustability for the overflow height and/or the overflow length. Depending upon the shape of the pipe segment, the configuration may influence the overflow height and/or overflow length without having to fall back upon expensive and operationally critical mechanisms.

In a further embodiment of the current invention the outlet opening for the separated, excess fiber stock suspension is located between the inlet opening for the fiber stock suspension and the outlet opening for the gas-free fiber stock suspension. Thereby the contaminated fiber stock suspension can be brought directly, without having to pass the outlet for deaerated fiber stock suspension, to the outlet opening and be removed.

In another embodiment of the invention the tank includes at least two outlet openings for separated, excess fiber stock suspension, whereby at least one outlet opening is designed as an outlet in the form of an outlet pipe with an overflow height and an overflow length and the additional outlet openings are equipped with covers. The presence of multiple outlet openings offers the technological advantage that the overflow which is designed as an overflow pipe may be located at various positions in the tank and therefore, it's specific location can be selected to best suit the fiber stock suspension characteristics.

In a further embodiment of the invention an overflow, designed as an overflow pipe with an overflow height and an overflow length is located prior to the outlet opening for the gas-free fiber stock suspension, as viewed in the direction of flow. The advantage is that the overflow for the gas-free fiber stock suspension can be placed at any desired location in the tank. It further provides the advantage that different volumes can be discharged in a fluidically optimum manner, by means of different size openings.

In a further embodiment of the invention a device is provided for producing vacuum in the tank including a vacuum connection, a vacuum line and at least one vacuum pump. Several vacuum connections can, at any given time, be operated individually with a separate vacuum line and a separate vacuum pump, or with individual vacuum lines and a common vacuum pump.

A further embodiment of the invention provides that in the upper interior tank area several nozzles are located for moistening the interior surface of the tank which does not come into contact with the fiber stock suspension, whereby the speed and efficiency of the fiber stock deaeration process taking place in the tank is positively influenced. Moisturizing also prevents fiber stock or ash deposits.

It is also advantageous if the distributer pipe is parallel or approximately parallel to the tank axis. The distributer pipe can be outside or inside the tank. This arrangement results in spacial (space requirement) and technological (distribution uniformity) advantages.

In a further embodiment of the invention the hydraulic stabilizer for the preferably gas-free fiber stock suspension is a dwell tank having a certain dwell duration and a certain dwell volume having fluidically optimum interior contours. The fluidically optimum interior contour is that of a horizontal cylinder, or that of a conical tube, aligned in the direction of flow of the fiber stock suspension. This hydraulic stabilizer is particularly suitable for new line installations for deaerating of fiber stock suspensions whose design principles for the tank construction in each case is disclosed in the aforementioned U.S. Pat. No. 5,868,905 (PK10542 US).

A further embodiment of the invention provides that, the dwell duration of the preferably gas-free fiber stock suspension in the hydraulic stabilizer is between 2 and 80 seconds, preferably between 5 and 40 seconds; and the dwell volume of the preferably gas-free fiber stock suspension in the hydraulic stabilizer is between 0.8 and 100 $m^3$, preferably between 4 and 70 $m^3$. These parameters have the advantage that they ensure optimum design of the above constant section and optimum operation as far as runability, etc. of the paper or cardboard machine. The hydraulic stabilizer is located immediately or indirectly following the outlet opening for the preferably gas-free fiber stock suspension.

According to the preferred embodiment of the invention there is located between the outlet opening for the preferably gas-free fiber stock suspension and the hydraulic stabilizer, at least one tube or pipeline.

It is also understood that the aforementioned and subsequently further explained characteristics of the invention may be utilized not only in the cited combinations, but also in other combinations, or self-contained, without relinquishing the scope of the invention.

Additional characteristics and advantages of the invention result from the subclaims and the following description of preferred design examples, whereby reference is made to the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a schematic and sectional side view of a device for deaerating a fiber stock suspension embodying the present invention;

FIG. 2 is another schematic and sectional side view of a device for deaerating a fiber stock suspension also embodying the present invention;

FIG. 3 is yet another schematic and sectional side view of a device for deaerating a fiber stock suspension also embodying the present invention; and FIG. 4 is yet still another schematic and sectional side view of a device for deaerating a fiber stock suspension also embodying the present invention.

Corresponding reference characters indicate corresponding parts throughout the several views. The exemplifications set out herein, illustrate one preferred embodiment of the invention, in one form, and such exemplifications are not to be construed as limiting the scope of the invention in any manner.

DETAILED DESCRIPTION OF THE INVENTION

Referring now to the drawings, and more particularly to FIG. 1, there is shown device 1 for deaerating fiber stock suspension 2 including horizontal tank 3 with a tank axis 3a into which fiber stock suspension 2, is supplied to a paper or cardboard machine, and is fed in the form of a thin mixture through at least one distributer pipe 4 which is parallel to tank axis 3a and from which a plurality of successive jet tubes 5 originate for feeding fiber stock suspension 2 into tank 3. The flow direction of fiber stock suspension 2 is shown by directional arrows 'S'. In an effort to improve the deaerating capabilities of device 1 introduced fiber stock suspension 2 which, at this point still contains gas, is fed through jet tubes 5 above liquid level 6 in tank 3, whereby gas 7 which may be present in the form of bubbles in fiber stock suspension 3 is separated before introduced fiber stock suspension 2 comes into contact with fiber stock suspension 2 already present in tank 3. Jet tubes 5 terminate in slightly below tank ceiling 8, reinforcing the deaeration process of fiber stock suspension 2, since fiber stock suspension 2 impacts with tank ceiling 8.

Referring additionally now to FIG. 2, a supply of fiber stock suspension 2 can also occur through a chamber system. Further, the addition of fiber stock suspension 2 may also occur in at least one of the ways described in unpublished German patent application DE 199 47 905.4 (PK10987 DE); its contents is herewith made the object of this description. In the upper area of tank ceiling 8 vacuum connection 9 with vacuum line 10 is connected to vacuum pump 11. Vacuum connection 9 may alternatively be located in a side area of tank ceiling 8. By connecting tank 3 to vacuum pump 11 the deaerating capability of device 1 is maximized, whereby gas 7 is pumped from tank 3 by vacuum pump 11.

Further, in the area of tank ceiling 8 facing away from jet tubes 7, several nozzles 13 are provided for the purpose of moistening tank surface 14 which is not in contact with fiber stock suspension 2. This positively influences the speed and efficiency of the fiber stock suspension deaeration process taking place in tank 3. Outlet opening 15 which flows into pipe system 16 for the purpose of discharging gas-free fiber stock suspension 2.1 is provided in the area of tank 3 which is facing away from distributor pipe 4. Between distributor pipe 4 and outlet opening 5 for gas-free fiber stock suspension 2.1, outlet opening 17 is provided for the separated, excess fiber stock suspension 2.2 which runs into pipe system 18 for the purpose of returning excess fiber stock suspension 2.2 into the circulation loop which is not illustrated here, which however, is well known in the art.

In one embodiment of the invention device 1 includes overflow 20 with overflow tube 19 having an overflow height $H_{\ddot{u}}$ and an overflow length $L_{\ddot{u}}$ located prior to outlet opening 17 to accommodate the flow of the separated, excess fiber stock suspension. Overflow tube 19 may be cylindrical or it may have a funnel like initial opening 21 having an aperture angle α, as illustrated in FIG. 1. The overflow length $L_{\ddot{u}}$ is calculated from the initial circumference of initial opening 21. The aperture angle α generally assumes a value of between 30° and 80°, preferably between 40° and 50°. Overflow pipe 19 including discharge pipe 18 may be designed movably in accordance with the sliding mechanism indicated by double arrow 22; allowing for adjustment in overflow height $H_{\ddot{u}}$. Weir 38 attached to the interior of tank 3 is located to deflect flow of the fiber stock suspension. In a preferred embodiment, pipe system 18 is adjustable in its length and form, such as a folded tube or similar. Overflow pipe 19 may be telescopic and divergent in nature providing adjustability of overflow height $H_{\ddot{u}}$. Overflow pipe 19 may be coupled with at least one pipe segment which will alter overflow height $H_{\ddot{u}}$ and/or overflow length $L_{\ddot{u}}$. Tank 3 may also include at least two outlet openings 17, for separated excess fiber stock suspension 2.2. At least one outlet opening 17 is designed as outlet 20 in the form of an outlet pipe 19 with an overflow height $H_{\ddot{u}}$ and an overflow length $L_{\ddot{u}}$ and whereby the at least one additional outlet opening is equipped with cover 36.

A schematic sectional side view of a second preferred embodiment of device 1 for deaerating fiber stock suspension 2, is illustrated in FIG. 2. Tank 3 inclusive of component parts and component groups of device 1 is described in the US-patent documentation U.S. Pat. No. 3,538,680 (~DE-A 17 61 496). The content of this aforementioned patent document is herewith made the object of this description. The supply of fiber stock suspension 2 into tank 3 occurs via a plurality of communicating chambers 23, whereby only two chambers 23 are indicated schematically. Communicating chambers 23 are located above liquid level 6 of fiber stock suspension 2 in tank 3. Please refer to FIGS. 1 and 2 regarding possible arrangement of outlet opening 17, including overflow pipe 19 for separated, excess fiber stock suspension 2.2. Overflow 25 in the form of overflow pipe 24 having overflow height $H_{\ddot{u}1}$ and overflow length $L_{\ddot{u}1}$ is located prior to outlet opening 15 for directing the flow of the gas free fiber stock suspension 2.1.

Concerning the arrangement of overflow pipe 24 we refer you to the details in FIG. 1 pertaining to overflow pipe 19 and overflow 20 for the flow of separated, excess fiber stock suspension 2.2.

Additionally referring to FIG. 3 there is shown device 1 designed for deaerating of fiber stock suspension 2. Device 1 includes horizontal cylindrical tank 3 with a tank axis 3a into which fiber stock suspension 2, that is to be supplied to the paper or cardboard machine, is fed in the form of a thin mixture through at least one distributer pipe 4 from which a multitude of successive jet tubes 5 originate for feeding fiber stock suspension 2 into tank 3. Regarding additional design characteristics please refer to tank 3 illustrated in FIG. 1. Outlet opening 26 for the flow of gas free fiber stock suspension 2.1 is located in floor 27 of tank 3. A vacuum in tank 3 is provided by way of vacuum connection 9, vacuum line 10, at least one vacuum pump 11, optional condensers 37 and continuing line 12 near tank ceiling 8. Further, in the area of tank ceiling 8 facing away from jet tubes 5, nozzles 13 are provided for the purpose of moistening interior tank surface 14 which is not in contact with fiber stock suspension 2.

Dwell chamber 28 in the form of hydraulic stabilizer 28.1 is located after at least one outlet opening 26 for the preferably gas-free fiber stock suspension 2, viewed in direction S. Dwell chamber 28 including preferably a long horizontally cylindrical tank, at least one inlet opening 29 to accept fiber stock suspension 2 coming from tank 3, at least one each outlet opening 30, 31, 32 located in tank 28. Outlet opening 30 provided for the flow of gas-free fiber stock suspension 2.1. Outlet opening 31 provided for the flow of gas 9, outlet 32 being provided for the flow of excess fiber stock suspension 2.2. Weir 38 may be attached to the interior of tank 3 and dwell chamber 28 being located to deflect flow of the fiber stock suspension. Overflow 33 in the embodiment of overflow tube 34 having overflow height $H_{\ddot{u}}$ and overflow length $L_{\ddot{u}}$. Regarding the arrangement of overflow tube 34 we refer you to the details in FIG. 1 of overflow pipe 19 of overflow 20 for separated, excess fiber stock suspension 2.2.

Hydraulic stabilizer 28.1 for preferably gas free fiber stock suspension 2 offers a dwell volume $V_V$ of between 0.8 and 100 m³, preferably between 4 and 70 m³, and dwell duration $V_D$ of preferably gas-free fiber stock suspension 2 in hydraulic stabilizer 28.1 is between 2 and 80 seconds, preferably between 5 and 40 seconds. Hydraulic stabilizer 28.1 is connected indirectly by tubing or piping with outlet opening 26 for the passage of preferably gas-free fiber stock suspension 2 and is located downstream from it.

Now further referring to FIG. 4 there is shown device 1 for deaerating fiber stock suspension 2, similar to FIG. 3. Tank 3 is consistent with tank 3 shown in FIG. 2 in a different view; we therefore refer you to FIG. 2 for the further description. Tank 28 is consistent with tank 28 illustrated in FIG. 3; therefore we refer you to FIG. 3 for further details.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Component Identification Index

1 Device (for deaerating fiber stock suspension)
Fiber stock suspension
2 Gas free fiber stock suspension
2.1 Separated, excessive fiber stock suspension
3 Tank
3a Tank axis
4 Distributer pipe
5 Jet tube
6 Liquid level
7 Gas
8 Tank ceiling
9 Vacuum connection
10 Vacuum line
11 Vacuum pump
12 Line
13 Nozzle
14 Tank interior surface
15,17,17.1
26,30,31,32 Outlet opening
16,18 Piping system (discharge)
19,24,34 Overflow pipe
20,25,33 Overflow
36 Cover
21 Funnel shaped initial section
22 Direction of movement
23 Chamber
27 Tank floor
28 Tank
28.1 Hydraulic Stabilizer
29 Inlet opening
37 Condenser
38 Weir
$H_{\ddot{u}}$, $H_{\ddot{u}1}$ Overflow height
$L_{\ddot{u}}$, $L_{\ddot{u}1}$ Overflow length
S Direction of flow (arrow)
$\alpha$ Aperture angle

What is claimed is:

1. A device for deaerating fiber stock suspension, comprising:
   a substantially enclosed, horizontally orientated cylinder tank having at least four openings including at least one outlet opening, said cylinder tank having a horizontal tank axis;
   a supply device configured for supplying the fiber stock suspension, said supply device including at least one of at least one distributer pipe and at least one communicating chamber, each said distributer pipe having at least one jet tube connected to said distributer pipe, at least one of said at least one jet tube and said at least one distributer pipe being inserted through at least one of said at least four openings, each said communicating chamber connected to at least one of said at least four openings;
   a vacuum system connected to at least one of said at least four openings of said cylinder tank; and
   an overflow tube having an end inserted through one of said at least four openings of said cylinder tank, said overflow tube having an overflow height and an overflow length being located prior to said at least one outlet opening, in a direction of flow of the fiber stock suspension.

2. The device of claim 1, wherein said inserted end of said overflow tube has a funnel shaped end with an aperture angle.

3. The device of claim 2, wherein said aperture angle is between 30° and 80°.

4. The device of claim 2, wherein said aperture angle is between 40° and 50°.

5. The device of claim 1, wherein said inserted end of said overflow tube is telescopically adjustable within said cylinder tank.

6. The device of claim 5, wherein said inserted end of said overflow tube is divergently adjustable.

7. The device of claim 1, wherein said inserted end of said overflow tube is moveable within said one opening in said cylinder tank.

8. The device of claim 7, further including an adapter, said adapter being adjustable in length and shape and fitted to said inserted end of said overflow tube.

9. The device of claim 1, further including at least one pipe segment, each said pipe segment having two ends, one said end of said at least one pipe segment being connected to said inserted end of said overflow tube.

10. The device of claim 1, wherein said at least four openings include at least one inlet opening for the fiber stock suspension and an outlet opening for gas-free fiber suspension, said inserted end of said overflow tube being located between said inlet opening and said outlet opening.

11. The device of claim 1, further including a fifth opening in said cylinder tank and a cover, said fifth opening being configured to accept one of said overflow tube and said cover.

12. The device of claim 1, further including at least one overflow adapter tube of predetermined height and shape having two ends, one said end of each said overflow adapter tube being connected within said cylinder tank to said at least one outlet opening.

13. The device of claim 1, wherein said vacuum system includes:
   a vacuum connector for connection to one of said at least four openings of said cylinder tank;
   at least one vacuum pump;
   a vacuum line having a first end and a second end, said first end being connected to said vacuum connector and the second end of said vacuum line being connected to said at least one vacuum pump; and
   a line having a first end and a second end, said first end being connected to said vacuum pump and said second end located at a point of discharge.

14. The device of claim 13, further including at least one condenser connected to said line.

15. The device of claim 1, further including a plurality of nozzles configured for moistening an interior surface of said cylinder tank not in contact with the fiber stock suspension, said nozzles being located along an upper portion of said cylinder tank.

16. The device of claim 1, wherein said supply device comprises one said distributer pipe, said distributer pipe being substantially parallel to said horizontal tank axis and disposed outside said cylinder tank.

17. The device of claim 1, wherein said supply device comprises one said distributer pipe being substantially parallel to said horizontal tank axis and disposed inside said cylinder tank.

18. The device of claim 1, further including at least one weir attached within said cylinder tank.

19. A device for deaerating fiber stock suspension, comprising:
- a substantially enclosed, horizontally oriented cylinder tank having at least three openings including at least one outlet opening, said cylinder tank having a horizontal tank axis;
- a supply device configured for supplying the fiber stock suspension, said supply device including at least one of at least one distributer pipe and at least one communicating chamber, each said distributer pipe having at least one jet tube connected to said distributer pipe, at least one of said at least one jet tube and said at least one distributer pipe being inserted through at least one of at least three openings of said cylinder tank, each said communicating chamber connected to at least one of said at least three openings of said communicating chamber;
- a vacuum system connected to at least one of said at least three openings of said cylinder tank;
- a hydraulic stabilizer tank having at least four openings, said at least four openings including at least one inlet opening and at least one outlet opening, said at least one inlet opening being connected to said at least one outlet opening of said cylinder tank, said hydraulic stabilizer tank being located after. said cylinder tank, in a direction of flow of the fiber stock suspension; and
- an overflow tube having an end inserted through one of said at least four openings of said hydraulic stabilizer tank, said overflow tube having an overflow height and an overflow length being located after said at least one outlet opening, in a direction of flow of the fiber stock suspension.

20. The device of claim 19, wherein said hydraulic stabilizer tank is configured to have dwell volume $V_V$ and dwell duration $V_D$, said hydraulic stabilizer tank having fluidically optimized interior contours.

21. The device of claim 20, wherein said hydraulic stabilizer tank comprises one of a horizontally oriented cylinder and a conical tube.

22. The device of claim 20, wherein $V_D$ is between 2 seconds and 80 seconds.

23. The device of claim 20, wherein $V_D$ is between 5 seconds and 40 seconds.

24. The device of claim 20, wherein $V_V$ is between 0.8 m$^3$ and 100 m$^3$.

25. The device of claim 20, wherein $V_V$ is between 4 m$^3$ and 70 m$^3$.

26. The device of claim 19, wherein there is a direct connection between said cylinder tank and said hydraulic stabilizer tank.

27. The device of claim 19, wherein there is an indirect connection between said cylinder tank and said hydraulic stabilizer tank.

28. The device of claim 19, further including at least one pipe, having one end of each said pipe being connected to said at least one outlet opening of said cylinder tank and the other end of each said pipe being connected to said at least one inlet opening of said hydraulic stabilizer tank.

29. The device of claim 19, wherein said inserted end of said overflow tube has a funnel shaped end with an aperture angle.

30. The device of claim 29, wherein said aperture angle is between 30° and 80°.

31. The device of claim 29, wherein said aperture angle is between 40° and 50°.

32. The device of claim 19, wherein said inserted end of said overflow tube is telescopically adjustable within said hydraulic stabilizer tank.

33. The device of claim 32, wherein said inserted end of said overflow tube is divergently adjustable.

34. The device of claim 19, wherein said inserted end of said overflow tube is movable within said one opening in said hydraulic stabilizer tank.

35. The device of claim 34, further including an adapter, said adapter being adjustable in length and shape and fitted to said inserted end of said overflow tube.

36. The device of claim 19, further including at least one pipe segment, each said pipe segment having two ends, one said end of said at least one pipe segment being connected to said inserted end of said overflow tube.

37. The device of claim 19, further including a fifth opening in said hydraulic stabilizer tank and a cover, said fifth opening being configured to accept one of said overflow tube and said cover.

38. The device of claim 19, further including at least one overflow adapter tube of predetermined height and shape having two ends, one said end of each said overflow adapter tube being connected within said hydraulic stabilizer tank to said at least one outlet opening.

39. The device of claim 19, wherein said vacuum system includes:
- at least one vacuum connector for connecting to at least one of said at least four openings of said hydraulic stabilizer tank and said at least one of three openings in said cylinder tank;
- at least one vacuum pump;
- at least one vacuum line, each said vacuum line having a first end and a second end, said first end being connected to said vacuum connector and the second end of said vacuum line being connected to said at least one vacuum pump; and
- a line having a first end and a second end, said first end being connected to said vacuum pump and said second end located at a point of discharge.

40. The device of claim 39, further including at least one condenser connected to said line.

41. The device of claim 19, further including a plurality of nozzles configured for moistening an interior surface of at least one of said cylinder tank and said hydraulic stabilizer tank not in contact with the fiber stock suspension, said nozzles being located along an upper portion of said cylinder tank and said hydraulic stabilizer tank.

42. The device of claim 19, wherein said supply device comprises one said distributer pipe, said distributer pipe being substantially parallel to said horizontal tank axis and disposed outside said cylinder tank.

43. The device of claim 19, wherein said supply device comprises one said distributer pipe being substantially parallel to said horizontal tank axis and disposed inside said cylinder tank.

44. The device of claim 19, further including at least one weir attached within said cylinder tank.

45. The device of claim 19, further including at least one weir attached within said hydraulic stabilizer tank.

* * * * *